United States Patent [19]

Yamagishi et al.

[11] Patent Number: 4,939,714
[45] Date of Patent: Jul. 3, 1990

[54] METHOD FOR FADING IN AND OUT REPRODUCED DIGITALLY RECORDED DATA

[75] Inventors: Koji Yamagishi; Naoki Masaki; Nobuaki Hisamatsu, all of Saitama, Japan

[73] Assignee: Pioneer Electronic Corporation, Tokyo, Japan

[21] Appl. No.: 161,054

[22] Filed: Feb. 26, 1988

[30] Foreign Application Priority Data

Feb. 27, 1987 [JP] Japan ............................ 62-46355
Feb. 27, 1987 [JP] Japan ............................ 62-46356
Feb. 27, 1987 [JP] Japan ............................ 62-46359

[51] Int. Cl.⁵ ............................................. H04N 5/76
[52] U.S. Cl. ..................................................... 369/59
[58] Field of Search ................... 369/83, 134, 47, 48, 369/49, 3; 360/14.1, 13, 59

[56] References Cited

U.S. PATENT DOCUMENTS 2,515,111  7/1950  Buchholzer et al. ............. 369/48
4,180,838 12/1979  Fehrenkamp ..................... 369/49
4,327,382  4/1982  Tanaka ............................. 360/13
4,363,049 12/1982  Ohtsuki et al. ................... 360/13
4,409,682 10/1983  Mori et al. ....................... 369/83
4,555,737 11/1985  Heitmann ...................... 360/14.1
4,636,880  1/1987  Debell .............................. 369/3

FOREIGN PATENT DOCUMENTS 0042613   3/1984  Japan ................................ 369/3
61-162878  7/1986  Japan .

Primary Examiner—Vincent P. Canney
Attorney, Agent, or Firm—Sughrue, Mion, Zinn, Macpeak & Seas

[57] ABSTRACT

A data reproducing method, such as may be used with a compact disk player or video disk player, in which data can be reproduced between any two designated points without disagreeable rapid cut-in or cut-off of the reproduced signal. During the reproduction of the disk in a first mode, address data for first and second positions is inputted. Then, in a second reproducing mode, the main data is faded in at the first position and faded out at the second position.

3 Claims, 5 Drawing Sheets

METHOD FOR FADING IN AND OUT REPRODUCED DIGITALLY RECORDED DATA

BACKGROUND OF THE INVENTION

The present invention relates to a data reproducing method which can be suitably applied to a compact disk player, video disk player, or the like.

In a compact disk or video disk, in addition to main data to be reproduced, address data are recorded so that a desired program can be reproduced by specifying the corresponding address.

For instance, in a compact disk, address data are recorded as shown in FIG. 1. The address data includes track numbers (or program numbers) assigned to the various programs (pieces of music), and index numbers which divide each program into smaller parts, for instance, corresponding to the movements of a piece of music. Reproduction can be started from a desired movement of a desired program by specifying the corresponding program number and index number.

With the program number and the index number utilized in the above-described manner, it is impossible, however, to specify the reproduction ending position, and the reproduction starting position must be selected from among a plurality of reproduction starting positions determined in advance.

The address data further include time data including music time and absolute time data. The music time is the time of reproduction from the top of a program, and the absolute time is the time of reproduction from the start position of the disk. Therefore, by specifying a track number and music times or absolute times, the data between two desired points can be reproduced.

Accordingly, reproduction of the main data is started, at a predetermined level, at one specified position, and reproduction is suspended at the other specified position As a result sound is abruptly reproduced at the one specified position, and the sound reproduction is abruptly suspended at the other, which may be disagreeable to the listener. This difficulty is significant in the reproduction of data between two given points because, in such data reproduction, unlike data reproduction using track number and index numbers, instead of a silent lead-in part (non-data part) of the main data being specified, a sound-containing part (data part) may be specified as the reproduction starting or ending position.

Further, for instance in the case where pieces of music recorded on a compact disk are reproduced in such a manner as to be recorded (dubbed) on a cassette tape, the reproduction time of the compact disk and the length of one side (or the continuous recording time) of the cassette tape must be taken into consideration. In order that the end of the tape is no reached before a piece of music has been reproduced in its entirely, that is, so that a piece of music may be fully recorded on the cassette tape, programming (music selection) must be carried out so that the total of reproduction times of a plurality of pieces of music is shorter than the continuous recording time (length) of the cassette tape. The end portion of the cassette tape thus dubbed generally has a relatively long silent part. Therefore, the tape is not suitable as a BGM (background music) tape.

Otherwise, if recording is continued, the tape is run completely to the end to record the piece of music. In this case, the recording of the piece music is suspended abruptly at the end of the tape. That is, the reproduction of the audio signal is stopped abruptly, which may again cause a disagreeable sensation.

Moreover, heretofore, in reproducing the data between two desired positions, the two positions are stored in memory by operating a memory switch at the first desired position in a reproduction mode, and then at the second desired position. When, at the second desired position, the memory switch is operated again, the first desired position is immediately searched for to start the reproduction the data between the two positions. That is, in the above-described method, only the data between two desired points can be reproduced.

SUMMARY OF THE INVENTION

Accordingly, an object of the invention is to provide a data reproduction system which can reproduce the data between two given points without producing disagreeable sensation on the listener.

The foregoing and other objects of the invention have been achieved by the provision of a data reproducing system in which, according to the invention, in reproducing main data and address data from a recording medium in a first reproduction mode, the address data at first and second positions where predetermined inputting operations are carried out are stored, and in reproducing the main data and address data in a second reproduction mode, the main data is faded in at the first position and then faded out at the second position.

The first reproduction mode is selected to specify the positions. When, in reproducing the main data and address data from the recording medium in the first reproduction mode, the first and second positions are inputted so that the address data corresponding to the first and second positions are stored. The second reproduction mode is selected to reproduce the data between the first and second positions. In the reproduction of data in the second reproduction mode, the main data is faded in at the first position and faded out at the second position.

Also, an object of the invention is to provide a data reproducing method in which fade-out reproduction can be readily and positively achieved within a predetermined length of a magnetic tape.

The foregoing object of the invention has been achieved by the provision of a data reproducing method in which, according to the invention, a predetermined input period of time is inputted in advance, a period of time which elapses from the start of the input period of time until a time instant which occurs earlier by a predetermined period of time than the end of the input period of time is calculated, more than one piece of data recorded in a recording medium are reproduced in an order recorded or programmed, and when the sum of the periods of time of reproduction of the data reaches the period of time thus calculated, the output level is gradually decreased, and the output level is zeroed when the sum of the periods of time of reproduction of the data becomes equal to the input period of time.

That is, more than one piece of data recorded in the recording medium are reproduced in an order recorded or programmed. The predetermined input period of time is set and inputted in advance. The period of time which elapses from the start of the input period of time until a time instant which occurs earlier by the predetermined period of time than the end of the input period of time is calculated. When the sum of the periods of time of reproduction of the data reaches the period of time thus calculated, the output level is gradually decreased, and the output level is zeroed when the sum becomes equal to the input period of time.

A still further object of the invention is to provide a data reproducing apparatus in which data defined by a plurality of positions can be reproduced in the same manner as data defined by one pair of positions.

The foregoing object of the invention has been achieved by the provision of a data reproducing method in which, according to the invention, first inputting means is operated when main data and address data recorded on a recording medium are reproduced in a first mode; second inputting means is operated when positions are specified; a memory stores, in response to the operation of the second inputting means, a plurality of pairs of address data which are reproduced in the first mode; third inputting means is operated when the main data and address data are reproduced in a second mode; and a control circuit searches in response to the operation of the third inputting means, the memory for the address data to allow the main data defined by the pairs of address data to be reproduced.

When the first inputting means is operated, the main data and address data recorded on the recording medium are reproduced in the first mode. When, during the reproduction in the first mode, the second inputting means is operated, the address data of the position where the second inputting means is operated is stored in the memory. This operation is carried out twice so that a pair of address data are stored in the memory. When, under the condition that a plurality of pairs of address data have been stored in the memory, the third inputting means is operated, the control circuit searches for the pairs of address data successively to allow the main data defined by the pairs of address data to be reproduced successively.

DESCRIPTION OF THE PREFERRED EMBODIMENTS

Figure 1:
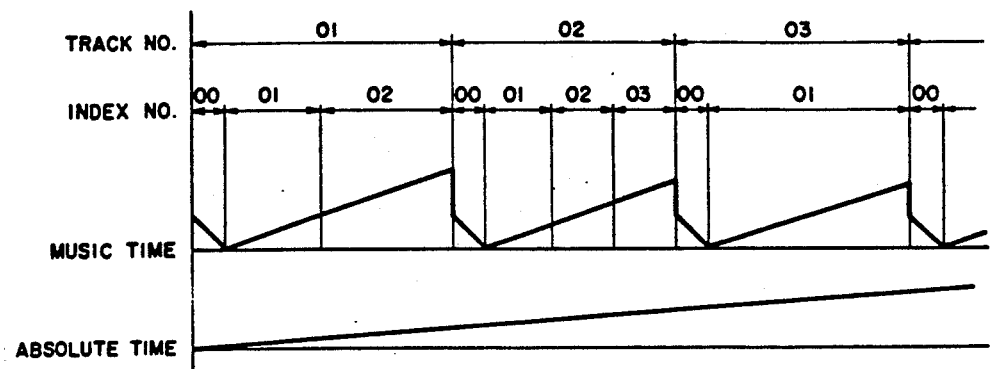
FIG. 1 is a timing chart for a description of the operation of a conventional disk player.
Figure 2:
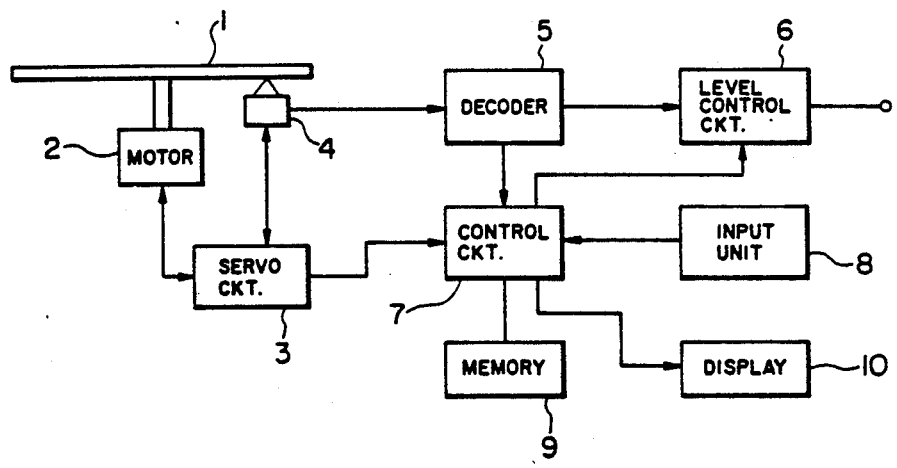
FIG. 2 is a block diagram showing a disk player according to the invention.

FIG. 2 is a block diagram showing a compact disk player (disk operating device) to which the data reproducing method of the invention is applied. When a first switch, for instance, a reproducing switch of an input unit 8 including operating buttons and switches is operated, a control circuit 7 inclusive of a microcomputer controls a servo circuit 3 to start an ordinary reproduction operation. In this operation, the servo circuit 3 controls a motor 2 so that a disk 1 is rotated, and further controls a pickup 4 so that at least main data, namely, an audio signal and address data, including an absolute time code, if desired, in combination with a track number (music number), index number and music time, are reproduced. The output signal from the pickup 4 is applied to a decoder 5 where it is decoded. The decoded audio signal is applied through a level control circuit 6 to an amplifier circuit (not shown), a loudspeaker (not shown), etc. The decoded absolute time signal is applied to the control circuit 7.

While listening to the reproduced sound, the operator operates a second switch of the input unit 8 when playing reaches a position where reproduction between two specified points is to be started. The control circuit 7 causes a memory 9 to store the absolute time ($t_1$ in FIG. 3) the second switch is operated Further, during reproduction, the operator operates the second switch when playing reaches the position where the reproduction between two points should be ended. (Two switches may be provided for inputting the reproduction starting position and reproduction ending position, respectively.) The absolute time ($t_2$ in FIG. 3) is stored in the memory 9 where it is paired with the absolute time $t_1$.

The above-described switching operations are repeatedly carried out so that pairs of absolute times ($t_3$ and $t_4$, and $t_5$ and $t_6$ in FIG. 3) are stored in the memory 9. The positions (absolute times) stored in the memory 9 can be displayed on a display unit 10 if desired.

After the positions for reproduction between two points have been inputted, in order to start the reproduction between two points, the operator operates a third switch of the input unit 8. The third switch is provided separately from the second switch to eliminate the difficulty that, immediately after a reproduction ending position has been inputted, reproduction between two points is carried out, and it thus becomes impossible to specify more than one pair of positions.

Upon operation of the third switch, the control circuit 7 selects a "window" reproduction mode different from the ordinary reproduction mode to control the servo circuit 3. As a result, the servo circuit 3 moves the pickup 4 radially of the disk to cause the latter to search for the first absolute time $t_1$. The control circuit 7 controls the level control circuit 6 until the reproduction absolute time outputted by the decoder 5 coincides with the absolute time $t_1$ stored in the memory 9 to mute the output signal. When the absolute time $t_1$ is detected, the control circuit 7 causes the display unit 10 to display the absolute time, while the control circuit 7 controls the servo circuit 3 to permit the ordinary reproduction to start at that position. Furthermore, the control circuit 7 controls the level control circuit 6 so that, when the muting operation is released, the output level is gradually increased for a predetermined period of time; that is, a so-called "fade-in operation" is carried out. Accordingly, the level of the reproduced audio signal outputted through the decoder 5 and the level control circuit 6 is gradually increased for the predetermined period of time; that is, it reaches a predetermined value in the predetermined period of time.

When, in the window reproduction mode, the absolute time $t_2$ is detected or an absolute time $t_2'$ earlier by a certain period of time than the absolute time $t_2$ is detected, the control circuit 7 causes the display unit to display the absolute time if desired, and controls the level control circuit 6 so that the output level is gradually decreased for a predetermined period of time; that is, a so-called "fade-out operation" is carried out. In the former case, the output level becomes zero (the output signal being muted) a predetermined period of time ($t_2 - t_2'$) after the absolute time $t_2$. In the latter case, the output level becomes zero at the absolute time $t_2$.

When the output signal has been muted, similarly to the above-described case, the control circuit 7 operates to detect the following absolute time $t_3$ to start reproduction in the fade-in mode and to end reproduction in the fade-out mode at the absolute time $t_4$.

Figure 3:
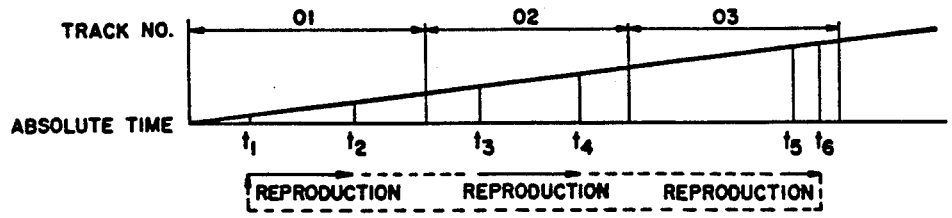
FIG. 3 is a timing chart used for a description of the operation of the disk player.

Similarly, for all remaining pairs of absolute times $t_5$ and $t_6$, $t_7$ and $t_8$, etc., inputted, the above-described sound reproducing operation is automatically carried out (FIG. 3).

Figure 4:
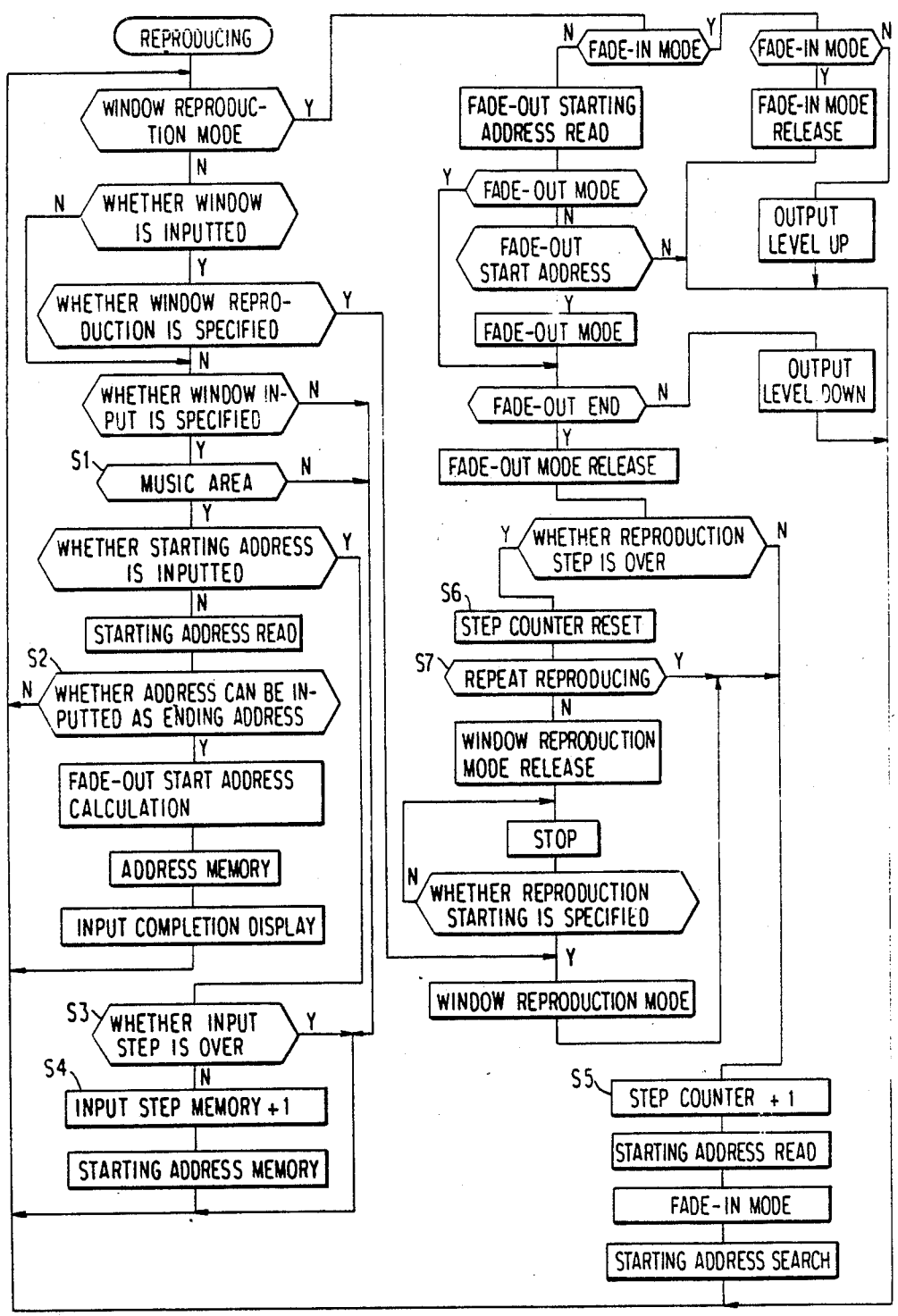
FIG. 4 is a flowchart for a description of the operation of the disk player.

FIG. 4 is a flowchart for achieving the above-described operations. The fundamental flow of the operations is the same as described above. A position between two points (window) can be specified (window input keying) only in the ordinary reproduction mode, not in the window reproduction mode. Furthermore, it is prohibited to specify a window in an area, such as a lead-in or lead-out area, other than a music area (Step S1). In Step S2, it is determined whether or not the address can be inputted as an ending address. This is to prevent the difficulty of an address smaller than the starting address paired therewith being inputted as the ending address by mistake. In Step S3, it is determined whether or not the number of input steps has been completed. In Step S4, the content of an input step memory is increased by one. The determination in Step S3 and the increment in Step S4 are used to limit the number of pairs (steps) which can be inputted to a predetermined value. Incrementing of a step counter in Step S5 and resetting of the step counter in Step S6 are employed to stop the reproducing apparatus (placing it in a stop mode) when all the audio signals defined by the pairs thus specified in the window reproduction mode have been reproduced. In the case where the input unit 8 has a fourth switch for instructing and inputting a repeat reproduction instruction, and in Step S7 it is determined whether or not a repeat reproduction instruction has been inputted. In the case where the repeat reproduction instruction has been inputted, and after all audio signals defined by the pairs of absolute times have been reproduced, reproduction of the audio signals is started again beginning with that defined by the first pair of absolute times.

In the above-described case, the audio signals defined by the pairs of absolute times inputted are reproduced successively in the order of the inputting the pairs of absolute times. However, reproduction may be specified (programmed) so that the audio signals are reproduced in an order different from that order. Furthermore, in the above-described case, it is impossible to input a window in the window reproduction mode. However, a modification may be made so that, in the window reproduction mode, a window can be additionally inputted. In reproducing audio signals defined by a plurality of pairs of absolute times in the above-described manner, sometimes it is unnecessary to perform the fade-in or fade-out operation. Therefore, the input unit 8 may have a fourth switch to determine whether or not the fade-in and fade-out operations are to be applied to the reproduction of audio signals. This determination may be made for each of the audio signals defined by the pairs of absolute times and stored in the memory 9 so that only the selected audio signals are reproduced in the fade-in and fade-out mode.

As described above, in the data reproducing system of the invention, in reproducing main data and address data from the memory medium in the first reproduction mode, the address data at the first and second positions where the predetermined inputting operations are carried out are stored, and in reproducing the main data and address data in the second reproducing mode, the main data is faded in at the first position and faded out at the second position. Therefore, reproduction of the main data between two desired positions can be achieved without any disagreeable sensation.

A further embodiment of the invention will now be discussed. A compact disk player (or disk playing apparatus) to which a data reproducing method of the invention is applied may be the same as that illustrated in FIG. 2 and discussed above.

Figure 5:
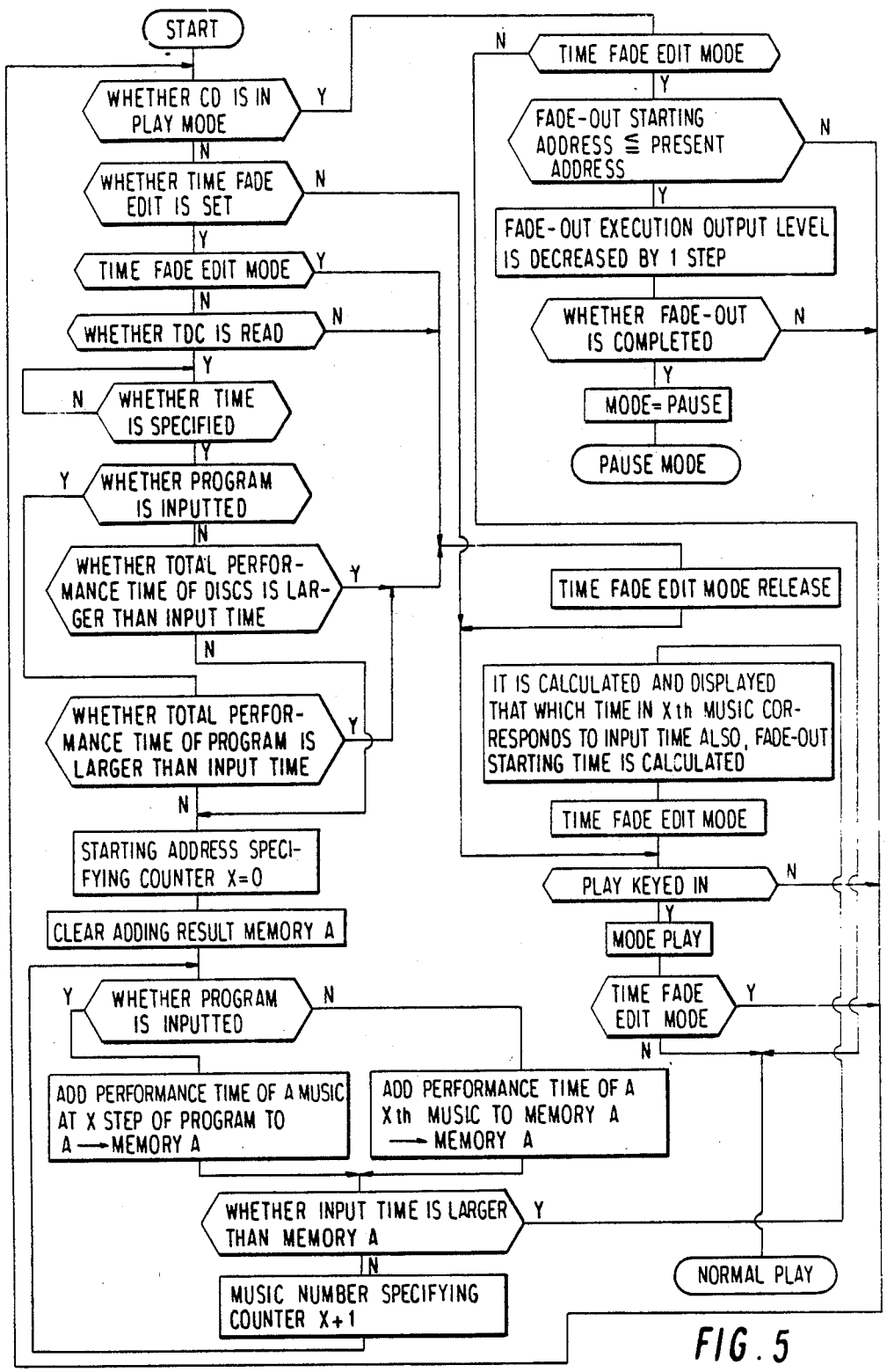
FIG. 5 is a flowchart used for a description of the operation of the disk player in accordance with a second embodiment of the invention.

In this embodiment, the control circuit 7 controls the operation of the player according to a sequence shown, for instance, in a flowchart of FIG. 5.

Figure 6:
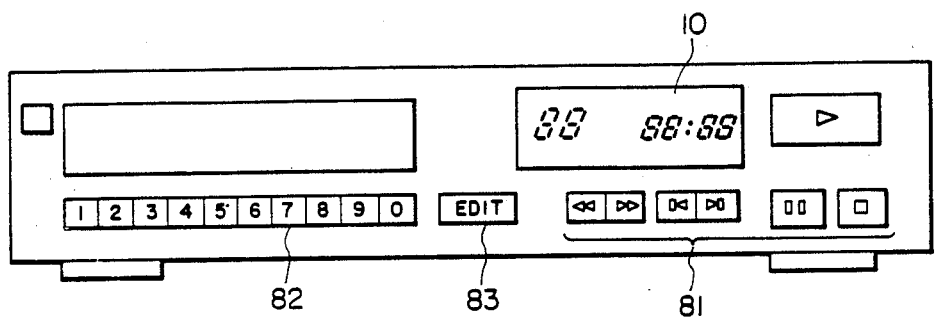
FIG. 6 is a front view of a disk player employing the invention.

First, it is determined whether or not a reproduction (play) mode is effected. In the case of this embodiment, the inputting unit 8, as shown in FIG. 6, has at least switches 81 for setting fundamental operational modes such as a play mode and a stop mode, a ten-key keyboard for inputting certain numerical data, and a switch for setting a time fade edit mode. Inputting the numerical data may be achieved with a switch other than the ten-key keyboard 82, that is, such may be carried out by operating a track forwarding key or the edit key (switch 83). When the reproduction mode has been inputted with the switch (play key) 81, it is determined whether or not the time fade edit mode has been set with the switch 83. Where the time fade edit mode is not set, ordinary reproduction (normal play) is carried out.

In this case, the pickup 4 reproduces a signal from the music region of the disk 1. The signal thus reproduced, after being decoded by the decoder 5, is supplied through the level control circuit 6 to an amplifier, loudspeaker, etc. (not shown).

Where the operation mode is not the reproduction mode, it is determined whether or not the switch 83 has been pressed (keyed in). Where the switch 83 is not operated, it is determined whether or not the switch (play key) 81 is operated. If, when the switch (play key) 81 is operated, the reproduction mode has been set and the time fade edit mode has not be set, ordinary reproduction is carried out, as described above. When it is detected that the time fade edit mode has been set, the above-described first step (to determine whether or not the reproduction mode is set) is effected again.

When the switch 83 is operated, it is determined whether or not the present operation mode is the time fade edit mode. When it is determined that the time fade edit mode has been set as the operation mode, the operation of the switch 83 is regarded as a releasing operation, and hence the time fade edit mode is eliminated.

When it is determined that the present mode is not the time fade edit mode, the next step of determining whether or not reading TOC data is accomplished. When it is determined that the TOC data has not been read, the above-described time fade edit mode releasing operation is carried out. When it is determined that TOC data has been read, an input time can be specified (inputted) with the keyboard 82.

An input time (for instance, 30 min.) corresponding, for instance, to the length of a dubbing magnetic tape is inputted with the keyboard 82. The input time is stored in the memory 9.

Next, it is determined whether or not a program for specifying the sequence of reproduction has been inputted. In the case where programmed music selection is not carried out, the data stored in the memory 9 are utilized so that the total performance time (accumulated time) of programs of the disk 1 is compared with the input time (30 min.). If the input time is larger, i.e., the reproduction time of the dubbing magnetic tape is longer than the total playing time of pieces of music, the time fade edit mode, being not required, is eliminated. In the case where programmed music selection is carried out, the total performance time of the selected pieces of music is compared with the input time. When the input time is larger, similarly the time fade edit mode is eliminated.

When the input time is shorter than the total reproduction time, the control circuit 7 operates to reset the value X of a counter built therein and to clear the value A of addition reproduction time of the memory 9.

In the case where programmed music selection is not carried out, the performance time of a piece of music having a music number indicated by the count value X of the counter is added to the value A, and in the case where the programmed music selection is carried out, the performance time of a piece of music having a play turn specified by the count value X is added to the value A.

Next, the value A is compared with the input time (30 min.). When the value A is equal to or smaller than the input time, the value X of the counter is increased by one so that the performance time of a piece of music having a music number or play turn specified by the value thus increased is added to the value A again.

When the value A becomes larger than the input time, the control circuit 7 detects where (or when) after reproduction of the top of the piece of music having the music number or play turn specified by the value X, the total playing time becomes equal to the input time and causes the display unit 10 to display that position (or time instant) so that the operator can detect where (when) the reproduction (dubbing) is ended. If the position is not suitable, then the input time may be renewed. The control circuit 7 determines a fade-out start position (time instant) earlier than the end of the input time by a predetermined period of time, for instance, five seconds, and stores that value in the memory 9. The predetermined period of time corresponds to the period of time required for the fade-out operation.

Upon completion of the above-described operation, the time fade edit mode is set. Upon operation of the switch (play key) 81, reproduction is carried out.

During the reproduction in the time fade edit mode, the fade-out start time (address) is compared with the present time (address). When the latter is equal to or larger than the former, the control circuit 7 controls the level control circuit 6 so that the reproduction output level is decreased by one step. The reproduction output level is gradually decreased in the above-described manner, that is, a fade-out operation is carried out. When the accumulated reproduction time becomes substantially equal to the input time, the fade-out operation is completed and the output level becomes zero, and hence the output is completely muted. At the same time the control circuit 7 controls the servo circuit 3 and changes the operation mode to a pause or stop mode.

In the above-described embodiment, the fade-out start time is set at a time instant slightly earlier than the end of the input time. However, it may be set at the end of the input time. However, in this case, during the fade out operation, the end of the dubbing tape may be reached. Therefore, it is desirable that, as in the above-described embodiment, the fade-out start time occur slightly earlier than the end of the input time.

As described above, in the data reproducing method of the second embodiment of the invention, a predetermined input period of time is inputted in advance, a period of time which elapses from the start of that input period of time until a time instant a predetermined period of time earlier than the end of the input period of time is calculated, more than one piece of data stored in a recording medium are reproduced in an order stored or programmed, and when the total of the periods of time of reproduction of the data reaches the period of time calculated, the output level is gradually decreased until it is zeroed at the end of the input period of time. Therefore, merely by setting the input time in correspondence, for instance, to the length of a dubbing magnetic tape, the blank part near the end of the tape can be made short, and the tape can be played back without any disagreeable sensation.

A third embodiment of the invention will now be described. This embodiment can also be practiced with the compact disk player of FIG. 2.

The operations up to the storage of the absolute times $t_3$ and $t_4$ and $t_5$ and $t_6$ using the first and second switches are the same as described above.

Upon operation of the third switch, the control circuit 7 selects a window reproduction mode different from the ordinary reproduction mode, and carries out control of the servo circuit 3. As a result, the servo circuit 3 moves the pickup 4 radially of the disk to cause the latter to search for the first absolute time $t_1$. The control circuit 7 controls the level control circuit 6 until the reproduction absolute time outputted by the decoder 5 coincides with the absolute time $t_1$ stored in the memory 9, thus muting the output signal. When the absolute time $t_1$ is detected, the control circuit 7 causes the display unit 10 to display it, if desired. The control circuit 7 controls the servo circuit 3 to allow the ordinary reproduction to start at that position. Furthermore, the control circuit 7 controls the level control circuit 6 to release the muting operation.

When, in the window reproduction mode, the absolute time $t_2$ is detected, the control circuit 7 causes the display unit 10 to display that values, if desired, and zeros, that is, mutes the output level.

Figure 7:
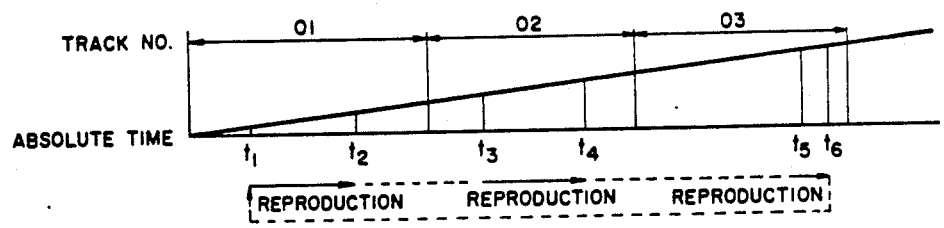
FIG. 7 is a timing chart used for a description of the operation of the compact disk player in accordance with a third embodiment of the invention.

When the output signal has been muted, similar to the above-described case, the control circuit 7 detects the following absolute time $t_3$ to start reproduction, and ends reproduction at the absolute time $t_4$. Similarly, for all remaining pairs of absolute times $t_5$ and $t_6$, $t_7$ and $t_8$, etc. inputted, the above-described sound reproducing operation is automatically carried out (FIG. 7).

Figure 8:
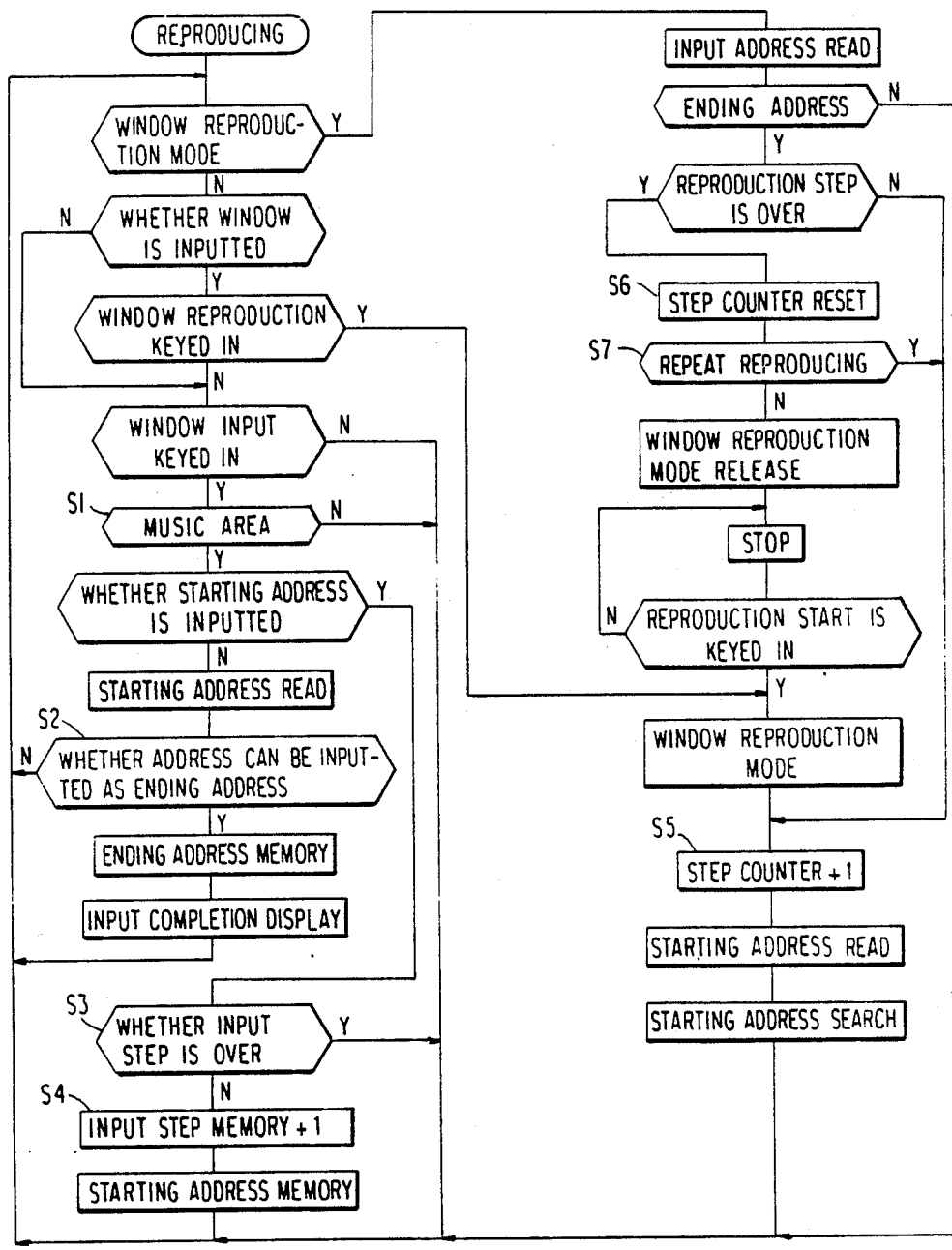
FIG. 8 is a flowchart used for a description of the operation of the compact disk player according to the third embodiment.

FIG. 8 is a flowchart describing in detail the above-described operations. The fundamental flow of the operations is the same as already described A position between two points (window) can be specified (window input keying) only in the ordinary reproduction mode, not in the window reproduction mode. Furthermore, it is prohibited to specify a window in an area (such as a lead-in or lead out area) other than a music area (Step S1). In Step S2, it is determined whether or not the address can be inputted as an ending address. This is done to eliminate the difficulty of an address smaller than the starting address paired therewith being inputted as the ending address by mistake In Step S3, it is determined whether or not the number of input steps has been completed. In Step S4, the content of an input step memory is increased by one. The determination in Step S3 and the incrementing in Step S4 are effected to limit the number of pairs (steps) which can be inputted to a predetermined value. Incrementing of a step counter in Step S5 and resetting of the step counter in Step S6 are done to stop the reproducing apparatus (placing it in a stop mode) when all the audio signals defined by the pairs specified in the window reproduction mode have been reproduced. In the case where the inputting unit 8 has a fourth switch for instructing and inputting a repeat reproduction, in step S7 it is determined whether or not a repeat reproduction instruction has been inputted. In the case where the repeat reproduction instruction has been issued, after all audio signals defined by the pairs of absolute times are reproduced, reproduction of the audio signals is started again beginning with that defined by the first pair of absolute times.

In the above-described case, the audio signals defined by the pairs of inputted absolute times are reproduced successively in the order of their inputting. However, reproduction may be specified (or programmed) so that the audio signals are reproduced in an order different from the above-described order. Furthermore, in the above-described case, it is impossible to input a window in the window reproduction mode. However, a modification may be made so that a window can be additionally inputted in the window reproduction mode. In addition, the circuit may be designed so that, in starting or ending the reproduction of each of the audio signals defined by a plurality of pairs of absolute times, the audio signal is faded in or faded out, as has already been described.

As described above, in the data reproducing method of the third embodiment invention, the first inputting means is operated in reproducing main data and address data in the first mode recorded on the recording medium; second inputting means is operated in specifying positions; the memory stores, in response to the operation of the second inputting means, a plurality of pairs of address data reproduced in the first mode; the third inputting means is operated in reproducing the main data and address data in the second mode; and the control circuit searches, in response to the operation of the third inputting means, the memory for the address data and allows the main data defined by the pairs of address data to be reproduced successively. Therefore, the main data defined by a plurality of pairs of positions can be reproduced successively similarly in the same manner as that defined by one pair of positions.

What is claimed is:

1. A data reproducing method comprising the steps of:
    continuously reproducing main data and address data from a recording medium at a normal speed;
    during said step of continuously reproducing said main data and said address data, operating inputting means to effect storing of at least first and second address data indicative of positions where, during subsequent reproduction of said recording medium, a reproduced output level of said main data is to be faded out and faded in, respectively;
    again continuously reproducing said main data and said address data from said recording medium at a normal speed; and
    during said step of again continuously reproducing said main data and said address data, fading out said main data at said first position from a specified final output reproduction level to silence and fading in said main data at said second position from silence to said specified final output reproduction level, and maintaining silence in said final output reproduction level after said main data has been faded out until said main data is subsequently faded in.

2. A data reproducing method comprising the steps of:
    operating first inputting means to effect continuous reproduction of main data and address data from a recording medium at a normal speed;
    during said step of continuously reproducing said main data and said address data, operating second inputting means to effect storing in a memory of a plurality of pairs of first and second address data indicative to starting and stopping positions of selected segments of said main data to be reproducing during subsequent reproduction of said recording medium;
    operating third inputting means to subsequently again effect reproduction of said recording medium;
    searching said memory in response to operation of said third inputting means to retrieve said pairs of address data; and
    reproducing continuously and successively from said recording medium to produce as a final reproduction output only said segments of said main data indicated by said pairs of address data.

3. The data reproducing method of claim 2, further comprising the steps of: fading in said main data from silence to a specified final output reproducing level at a first address datum of each of said pairs of address data and fading out said main data from said specified final output reproduction level to silence at a second address datum of each of said pairs of address data.

* * * * *